United States Patent
Chiang et al.

(10) Patent No.: US 9,366,949 B2
(45) Date of Patent: Jun. 14, 2016

(54) PICO PROJECTION FIXING MODULE

(71) Applicant: LITE-ON TECHNOLOGY CORPORATION, Taipei (TW)

(72) Inventors: Chi-Feng Chiang, Taipei (TW); Chuan Lee, Taipei (TW); Cheng-Chung Hsu, Taipei (TW); Chia-Yuan Lin, Taipei (TW); Meng-Che Lin, Taipei (TW); Wei-Chih Lin, Taipei (TW)

(73) Assignee: LITE-ON TECHNOLOGY CORPORATION, Taipei (TW)

( * ) Notice: Subject to any disclaimer, the term of this patent is extended or adjusted under 35 U.S.C. 154(b) by 0 days.

(21) Appl. No.: 14/595,701

(22) Filed: Jan. 13, 2015

(65) Prior Publication Data

US 2015/0205191 A1    Jul. 23, 2015

(30) Foreign Application Priority Data

Jan. 20, 2014  (CN) .......................... 2014 1 0026375

(51) Int. Cl.
*G03B 21/20* (2006.01)
*G03B 21/28* (2006.01)

(52) U.S. Cl.
CPC .......... *G03B 21/2093* (2013.01); *G03B 21/208* (2013.01); *G03B 21/2013* (2013.01); *G03B 21/2033* (2013.01); *G03B 21/28* (2013.01)

(58) Field of Classification Search
CPC .. G02B 6/0028; G02B 6/0078; G02B 6/0068; G02B 6/0076; G03B 21/28; G03B 21/208; G03B 21/2013; G03B 21/2033; G03B 21/2093
See application file for complete search history.

(56) References Cited

U.S. PATENT DOCUMENTS

| | | | | |
|---|---|---|---|---|
| 7,048,390 B2* | 5/2006 | Kitabayashi | ........... | H04N 9/317 348/745 |
| 8,967,811 B2* | 3/2015 | Jaffe | ........................ | F21V 9/16 353/122 |
| 2006/0203486 A1* | 9/2006 | Lee | ...................... | G02B 6/0018 362/244 |
| 2011/0037953 A1* | 2/2011 | Nizani | ................... | G02B 3/005 353/38 |
| 2011/0228195 A1* | 9/2011 | Shikii | ................. | G02B 6/0031 349/62 |
| 2012/0249981 A1* | 10/2012 | Hirosawa | ........... | G03B 21/2033 353/100 |

* cited by examiner

*Primary Examiner* — Sultan Chowdhury
(74) *Attorney, Agent, or Firm* — WPAT, PC; Justin King

(57) ABSTRACT

A pico projection fixing module includes a bracket main body, at least two collimator lenses, and at least two color light sources. The bracket main body includes an upper part, a lower part, a connecting part and at least two assembling seats. The upper part and the lower part are located at bilateral sides of the connecting part. Each of the assembling seats includes an opening and a clamping part. The opening is formed on the connecting part. The clamping part is disposed on the upper part and the lower part. The at least two collimator lenses are installed on the connecting part and corresponded to the corresponding openings. The at least two color light sources are installed on the corresponding clamping parts and aligned with the corresponding collimator lenses. The clamping parts corresponding to the assembling seats are separated from each other.

9 Claims, 4 Drawing Sheets

PICO PROJECTION FIXING MODULE

This application claims the benefit of People's Republic of China Patent Application No. 201410026375.5, filed Jan. 20, 2014, the subject matter of which is incorporated herein by reference.

FIELD OF THE INVENTION

The present invention relates to a pico projection fixing module, and more particularly to a pico projection fixing module with a bracket main body to reduce the installing space in order to reduce the overall size of the pico projector.

BACKGROUND OF THE INVENTION

Projectors are widely used in many circumstances. Recently, with increasing development of science and technology, a pico projector (also referred as a microdisplay) has been introduced into the market. The pico projector is designed to have small size and light weightiness. Generally, the pico projector is embedded into a portable electronic device (e.g. a mobile phone or a personal digital assistant), so that the pico projector may be directly utilized. Alternatively, the pico projector is separated from the portable electronic device, and thus the pico projector may be operated after the pico projector is in communication with the portable electronic device. By mean of the pico projector, a corresponding projection image may be projected on a flat projection surface to be viewed by the user. In such way, the image to be shown may be projected in a maneuverable and real-time manner.

Generally, the pico projector uses light sources to emit light beams, and projects the light beams on the projection surface through a projection module. In a conventional pico projector, the projection module is for example an LCoS (liquid crystal on silicon) panel, a reflective LCD (liquid crystal display) panel, a DMD (digital Micro-mirror device) or a micro scanning mirror (i.e. according to a MEMS technology). Before the light beams are projected out through the projection module, the light beams are homogenized, focused or shaped by associated optical elements of the pico projector. After the light beams are homogenized, focused or shaped, the adjusted light beams are projected out. Generally, the light sources used in the pico projector are for example LED light sources or laser light sources.

FIG. 1 is a schematic planar view illustrating a portion of a conventional pico projector. As shown in FIG. 1, the conventional pico projector 1 comprises three primary color light sources 11, 12 and 13. For example, the color light source 11 is a red light source, the color light source 12 is a green light source, and the color light source 13 is a blue light source. The three primary color light sources 11, 12 and 13 are laser light sources. The pico projector 1 further comprises three collimator lenses 110, 120 and 130 corresponding to the three primary color light sources 11, 12 and 13, respectively. The color light beams from the three primary color light sources 11, 12 and 13 are adjusted by the collimator lenses 110, 120 and 130. The pico projector 1 further comprises two dichroic mirrors 141 and 142. The color light beams from the three primary color light sources 11, 12 and 13 are selectively transmitted through or reflected by the dichroic mirrors 141 and 142, so that the three color light beams are mixed with each other. Afterwards, the mixed light beam is projected as a projection image by a projection module 15.

The conventional pico projector 1 further comprises a fixing module 10 for fixing and installing the light sources, the collimator lenses, the dichroic mirrors or other optical elements. However, the conventional pico projector still has some drawbacks. For example, in the fixing module 10, specified spaces should be retained at the positions near the collimator lenses 110, 120 and 130 for allowing associated jig tools to clamp, install or adjust the collimator lenses 110, 120 and 130. Under this circumstance, the overall size of the pico projector fails to meet the miniaturization requirements.

SUMMARY OF THE INVENTION

The present invention provides a pico projection fixing module. The pico projection fixing module comprises a bracket main body with a special structure. By the special structure of the bracket main body, the distances between the collimator lenses or the color light sources may be effectively reduced. Since the possibility of wasting the layout space is reduced, the overall size of the pico projector with the pico projection fixing module is largely reduced.

An embodiment of the present invention provides a pico projection fixing module for a pico projector. The pico projection fixing module includes a bracket main body, at least two collimator lenses corresponding to the assembling seats, and at least two color light sources corresponding to the assembling seats. The bracket main body includes an upper part, a lower part, a connecting part and at least two assembling seats. The upper part and the lower part are located at bilateral sides of the connecting part. Each of the assembling seats includes an opening and a clamping part. The opening is formed on the connecting part. The clamping part is disposed on the upper part and the lower part. The at least two collimator lenses are installed on the connecting part and corresponded to the corresponding openings. The at least two color light sources are installed on the corresponding clamping parts and aligned with the corresponding collimator lenses. The clamping parts corresponding to the assembling seats are separated from each other.

Numerous objects, features and advantages of the present invention will be readily apparent upon a reading of the following detailed description of embodiments of the present invention when taken in conjunction with the accompanying drawings. However, the drawings employed herein are for the purpose of descriptions and should not be regarded as limiting.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
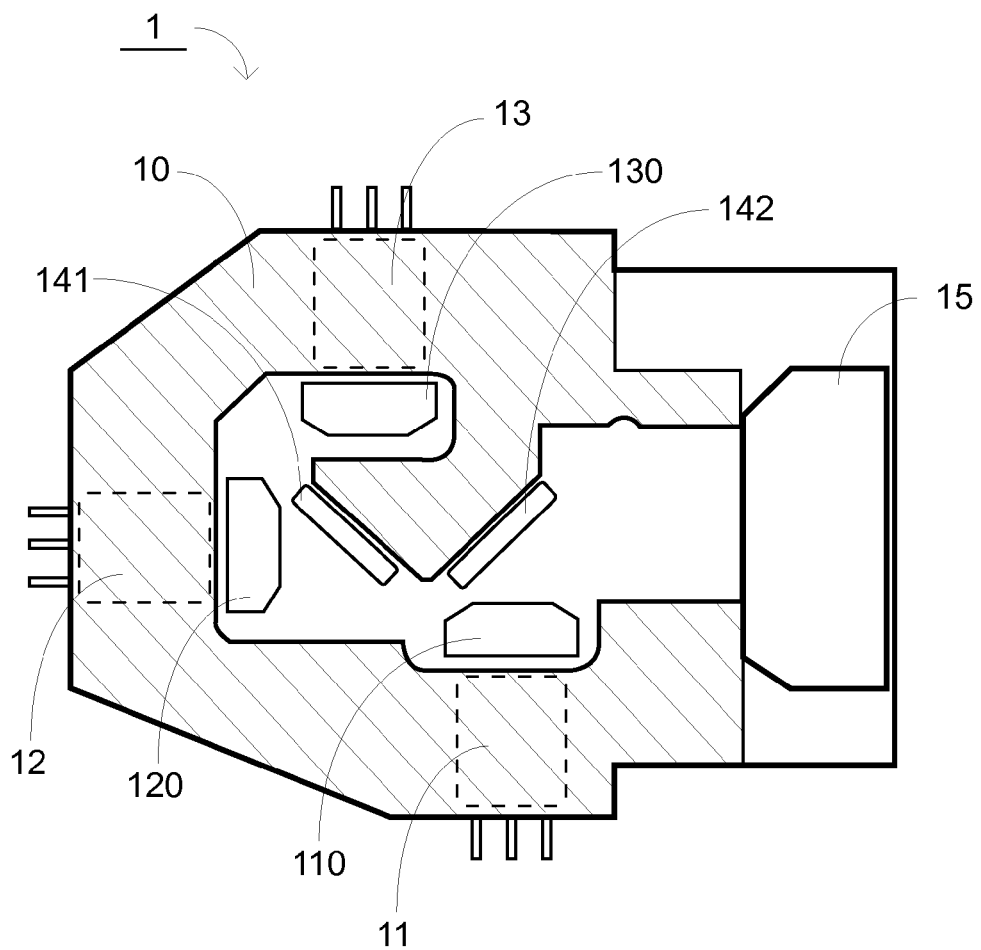
FIG. 1 (prior art) is a schematic planar view illustrating a portion of a conventional pico projector.
Figure 2:
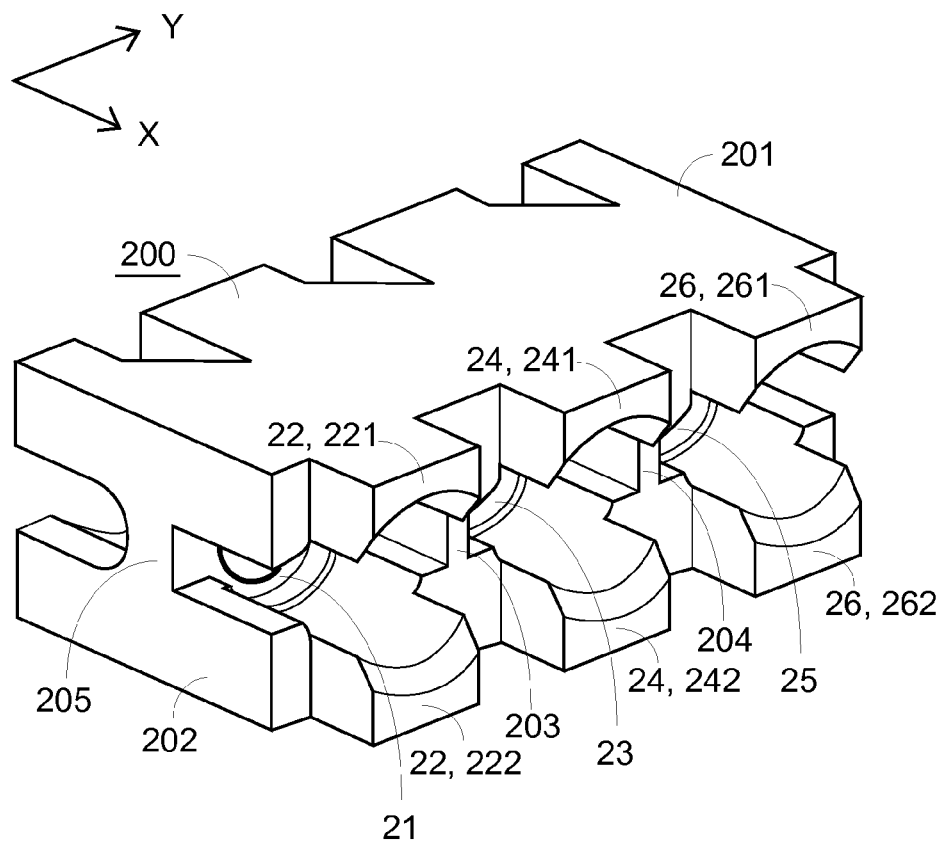
FIG. 2 is a schematic perspective view illustrating a bracket main body of a pico projection fixing module according to an embodiment of the present invention.

FIG. 2 is a schematic perspective view illustrating a bracket main body of a pico projection fixing module according to an embodiment of the present invention. As shown in FIG. 2, the pico projection fixing module comprises a bracket main body 200. The bracket main body 200 is substantially a rectangular frame. Moreover, the bracket main body 200 comprises an upper part 201, a lower part 202, and a connecting part 205. The upper part 201 and the lower part 202 are located at bilateral sides of the connecting part 205. By the connecting part 205, the space between the upper part 201 and the lower part 202 is divided into two segments along the X-axis direction.

Figure 3A:
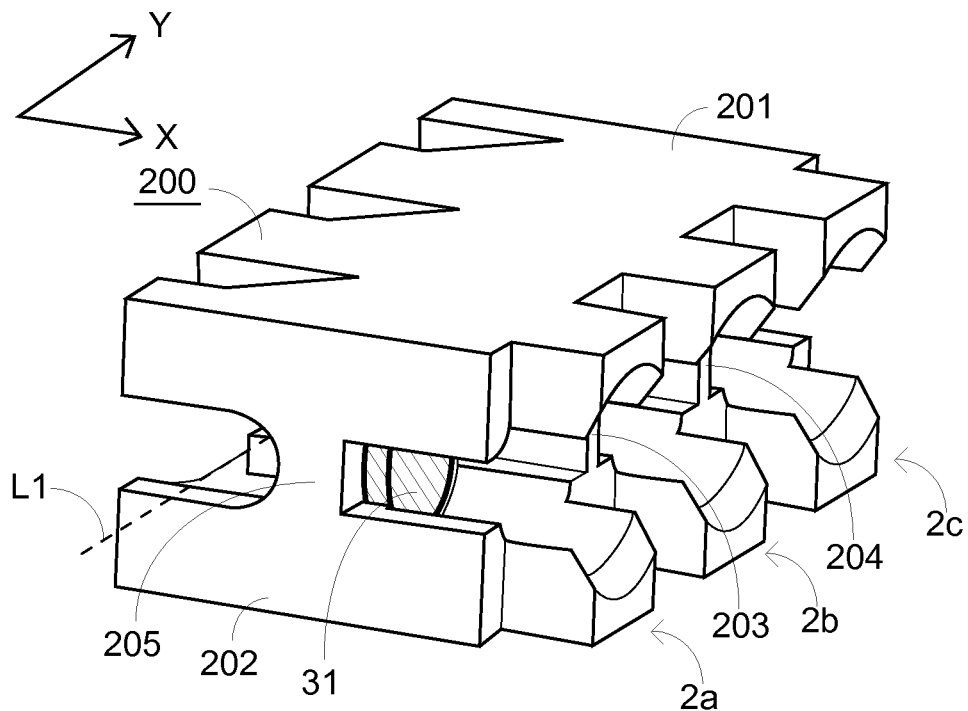
FIG. 3A is a schematic perspective view illustrating the combination of the bracket main body and a collimator lens of the pico projection fixing module according to the embodiment of the present invention.

In this embodiment, the bracket main body 200 comprises at least one partition structure. By the at least one partition structure, the space between the upper part 201 and the lower part 202 is divided into plural assembling seats along the Y-axis direction. In this embodiment, as shown in FIG. 3A, the space between the upper part 201 and the lower part 202 is divided into three assembling seats 2a, 2b and 2c along the Y-axis direction by two partition structures 203 and 204. These assembling seats 2a, 2b and 2c are arranged side by side along the Y-axis direction.

Figure 3B:
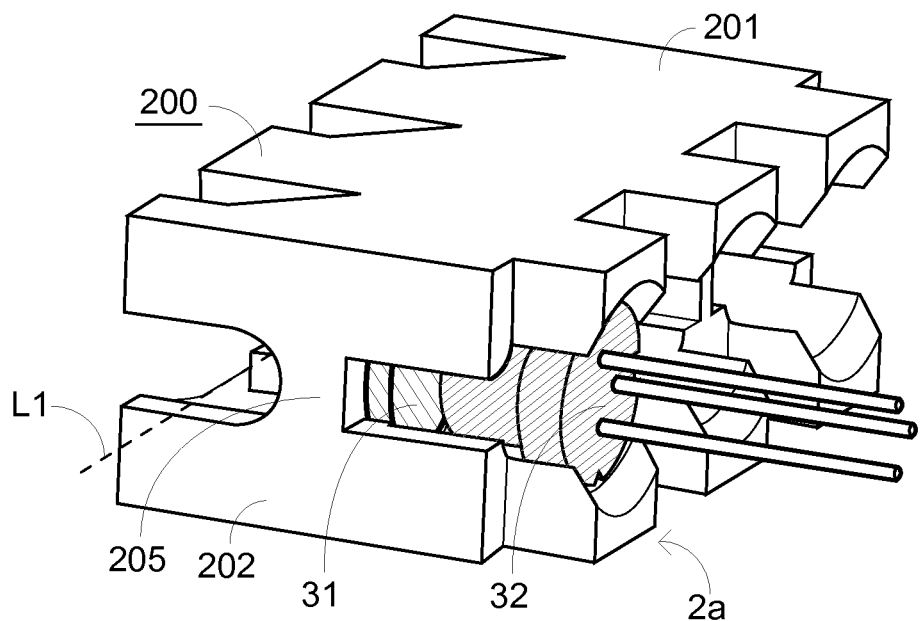
FIG. 3B is a schematic perspective view illustrating the combination of the bracket main body and a color light source of the pico projection fixing module according to the embodiment of the present invention.

Moreover, the pico projection fixing module is applied to a pico projector. That is, the pico projection fixing module further comprises plural collimator lenses and plural color light sources. The number of the collimator lenses and the number of the color light sources are both equal to the number of the assembling seats. The method of assembling or installing the collimator lenses and the color light sources will be illustrated with reference to FIGS. 3A and 3B. In FIG. 3A, the collimator lens 31 is installed on the bracket main body 200. In FIG. 3B, the color light source 32 is installed on the bracket main body 200. That is, the method of installation on the assembling seat 2a is shown in FIGS. 3A and 3B.

Figure 4:
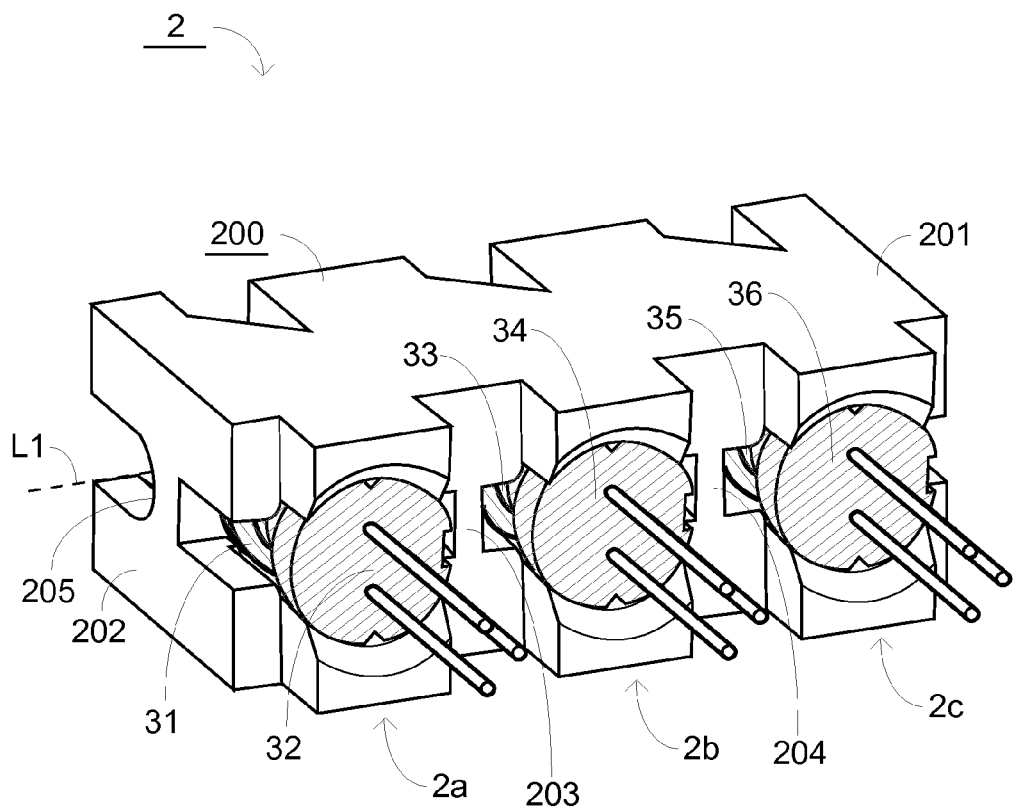
FIG. 4 is a schematic assembled view illustrating the pico projection fixing module according to the embodiment of the present invention.

FIG. 4 is a schematic assembled view illustrating the pico projection fixing module according to the embodiment of the present invention. In this embodiment, the pico projection fixing module 2 comprises three collimator lenses 31, 33 and 35 and three color light sources 32, 34 and 36 corresponding to the assembling seats 2a, 2b and 2c. Moreover, the color light sources 32, 34 and 36 are laser light sources for emitting a red light beam, a green light beam and a blue light beam (i.e. three primary color light beams RGB). It is noted that the number of the color light sources are not restricted to three. For example, in some other embodiments, the pico projection fixing module comprises four light sources RGGB and four assembling seats. In this embodiment, each assembling seat is corresponded to one color light source and one collimator lens.

The structure of each assembling seat will be illustrated in more details as follows. As shown in FIG. 2, the assembling seat 2a comprises an opening 21 and a clamping part 22; the assembling seat 2b comprises an opening 23 and a clamping part 24; and the assembling seat 2c comprises an opening 25 and a clamping part 26. The openings 21, 23 and 25 are formed on the connecting part 205. The clamping parts 22, 24 and 26 are disposed on the upper part 201 and the lower part 202. Moreover, the openings 21, 23 and 25 run through the connecting part 205. Consequently, the color light beams from the color light sources 32, 34 and 36 that are installed on the corresponding assembling seats can be transmitted through the openings 21, 23 and 25 to be projected out.

In this embodiment, the collimator lenses 31, 33 and 35 are installed on the connecting part 205, and corresponded to the openings 21, 23 and 25 of corresponding assembling seats 2a, 2b and 2c (see FIG. 3A). The color light sources 32, 34 and 36 are installed on the clamping parts 22, 24 and 26 and aligned with corresponding collimator lenses 31, 33 and 35, respectively (see FIG. 3B). The resulting structure of the pico projection fixing module 2 with the three assembling seats 2a, 2b and 2 is shown in FIG. 4.

In this embodiment, the assembling seats 2a, 2b and 2c are arranged side by side. Consequently, the color light beams from the color light sources 32, 34 and 36 are directed along the same direction, or the color light beams from the color light sources 32, 34 and 36 may be adjusted as parallel light beams by the collimator lenses 31, 33 and 35 to be projected out. In accordance with the present invention, after the collimator lenses 31, 33 and 35 are installed on the connecting part 205 and corresponded to the corresponding openings 21, 23 and 25, the color light sources 32, 34 and 36 are installed on the clamping parts 22, 24 and 26 and aligned with the corresponding collimator lenses 31, 33 and 35.

Moreover, the clamping part 22 comprises an upper clamping structure 221 and a lower clamping structure 222; the clamping part 24 comprises an upper clamping structure 241 and a lower clamping structure 242; and the clamping part 26 comprises an upper clamping structure 261 and a lower clamping structure 262. These upper clamping structures 221, 241 and 261 are extended from an edge of the upper part 201 of the bracket main body 200. These lower clamping structures 222, 242 and 262 are extended from an edge of the lower part 202 of the bracket main body 200. In this embodiment, the openings 21, 23 and 25 are circular openings. The upper clamping structures 221, 241 and 261 and the lower clamping structures 222, 242 and 262 have curvy surfaces facing each other. Consequently, respective cylindrical spaces are enclosed by the upper clamping structures 221, 241 and 261 and the lower clamping structures 222, 242 and 262 collaboratively.

In accordance with a feature of the present invention, there are gaps between the upper clamping structures 221, 241 and 261 and the lower clamping structures 222, 242 and 262 of the bracket main body 200, respectively. That is, the upper clamping structures 221, 241 and 261 and the lower clamping structures 222, 242 and 262 are separated from each other and disconnected from each other. In other words, the upper clamping structures 221, 241 and 261 may be considered as suspension arms extended from the edge of the upper part 201, and the lower clamping structures 222, 242 and 262 may be considered as suspension arms extended from the edge of lower part 202. Consequently, there are enough leeway spaces between respective clamping structures in order for allowing associated jig tools (e.g. clamps) to assemble and adjust the color light sources 32, 34 and 36.

Moreover, the collimator lenses 31, 33 and 35 may be respectively fixed on the connecting part 205 through adhesives (not shown). For example, the adhesives are UV curing adhesives. First, the adhesives are dispensed on the predetermined positions and the collimator lenses 31, 33 and 35 are adjustably installed on the predetermined positions. After the UV curing adhesives are exposed to UV light, the UV curing adhesives are solidified, the collimator lenses 31, 33 and 35 are securely fixed on the predetermined positions. After the collimator lenses 31, 33 and 35 are securely fixed on the predetermined positions, the collimator lenses 31, 33 and 35 cannot be adjusted again. For achieving the optimal projection efficacy, the manufacturer has to adjust the color light sources 32, 34 and 36 directly. For example, during the procedure of using jig tools (e.g. clamps) to clamp the color light sources 32, 34 and 36 and the procedure of installing the color light sources 32, 34 and 36 on the clamping parts 22, 24 and 26, the orientations of the color light sources 32, 34 and 36 may be elaborately adjusted. Consequently, the optimal projection efficacy is achievable.

In accordance with another feature of the present invention, the assembling seats 2a, 2b and 2c are independent from each other. In particular, the assembling seats 2a, 2b and 2c are separated from each other by the partition structures 203 and 204 in the bracket main body 200. Consequently, the assembling seats 2a, 2b and 2c are isolated and separated from each other. In views of the relative positions, the partition structures 203 and 204 are located at lateral sides of the assembled color light sources 32, 34 and 36 and the assembled collimator lenses 31, 33 and 35. Under this circumstance, the majorities of the color light sources 32, 34 and 36 and the majorities of the collimator lenses 31, 33 and 35 are sheltered by the partition structures 203 and 204.

Due to the isolation efficacy of the partition structures 203 and 204, the scattering phenomenon or the diffusion phenomenon of the color light beams from the color light sources 32, 34 and 36 will be isolated and not be interfered with each other. More especially, since the bracket main body 200 is made of an opaque material and the partition structures 203 and 204 provides the isolation efficacy, the possibility of causing interference between the color light beams from the color light sources 32, 34 and 36 will be minimized or eliminated. Under this circumstance, the performance of the projection image is enhanced.

Moreover, an optical path L1 is also shown in the drawings. Moreover, the pico projection fixing module 2 further comprises plural dichroic mirrors (not shown). The dichroic mirrors are aligned with the collimator lenses 31, 33 and 35, respectively. That is, the dichroic mirrors are opposed to the collimator lenses 31, 33 and 35 with respect to the openings 21, 23 and 25. The color light beams from the color light sources 32, 34 and 36 are selectively transmitted through or reflected by the dichroic mirrors, so that the three color light beams are mixed with each other and projected out along the same optical path L1.

From the above descriptions, the present invention provides a pico projection fixing module. In comparison with the conventional technology of adjusting the collimator lenses, the present invention adjusts the color light sources to achieve the optimal projection efficacy. In addition, the working space of adjusting the color light sources is moved to the outside of the same edge of the pico projection fixing module. By the special structure of the bracket main body, the distances between the collimator lenses or the color light sources may be effectively reduced. Since the possibility of wasting the layout space is reduced, the overall size of the pico projector with the pico projection fixing module is largely reduced. Moreover, the pico projection fixing module is effective to minimize the interference between the color light beams from the color light sources.

Consequently, the pico projection fixing module of the present invention can enhance the projecting performance while eliminating the drawbacks of the conventional pico projector.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A pico projection fixing module for a pico projector, the pico projection fixing module comprising:
    a bracket main body comprising an upper part, a lower part, a connecting part and at least two assembling seats, wherein the upper part and the lower part are located at bilateral sides of the connecting part, wherein each of the assembling seats comprises an opening and a clamping part, wherein the opening is formed on the connecting part, and the clamping part is disposed on the upper part and the lower part, wherein the clamping part comprises an upper clamping structure and a lower clamping structure, wherein the upper clamping structure is a suspension arm extended from an edge of the upper part, and the lower clamping structure is another suspension arm extended from an edge of lower part;
    at least two collimator lenses corresponding to the assembling seats, respectively, wherein the at least two collimator lenses are installed on the connecting part and corresponded to the corresponding openings; and
    at least two color light sources corresponding to the assembling seats, respectively, wherein the at least two color light sources are installed on the corresponding clamping parts and aligned with the corresponding collimator lenses,
    wherein the clamping parts corresponding to the assembling seats are separated from each other.

2. The pico projection fixing module as claimed in claim 1, wherein the upper clamping structure and the corresponding lower clamping structure are separated from each other by a gap.

3. The pico projection fixing module as claimed in claim 1, wherein the opening runs through the connecting part.

4. The pico projection fixing module as claimed in claim 1, wherein each clamping part comprises an upper clamping structure and a lower clamping structure, wherein the upper clamping structure and the lower clamping structure have curvy surfaces facing each other.

5. The pico projection fixing module as claimed in claim 1, wherein the color light sources are laser light sources.

6. The pico projection fixing module as claimed in claim 1, wherein the collimator lenses are fixed on the connecting part through adhesives.

7. The pico projection fixing module as claimed in claim 1, wherein the bracket main body further comprises at least one partition structure, wherein a space between the upper part and lower part is divided into the at least two assembling seats by the at least one partition structure, so that the at least two assembling seats are separated from each other in the space.

8. The pico projection fixing module as claimed in claim 1, wherein the color light beams from the color light sources are directed along the same direction and are parallel with each other.

9. The pico projection fixing module as claimed in claim 1, wherein the pico projection fixing module further comprises plural dichroic mirrors, wherein the dichroic mirrors are opposed to the corresponding collimator lenses with respect to the corresponding openings, wherein the color light beams from the color light sources are selectively transmitted through or reflected by the dichroic mirrors.

\* \* \* \* \*